United States Patent Office 3,723,169
Patented Mar. 27, 1973

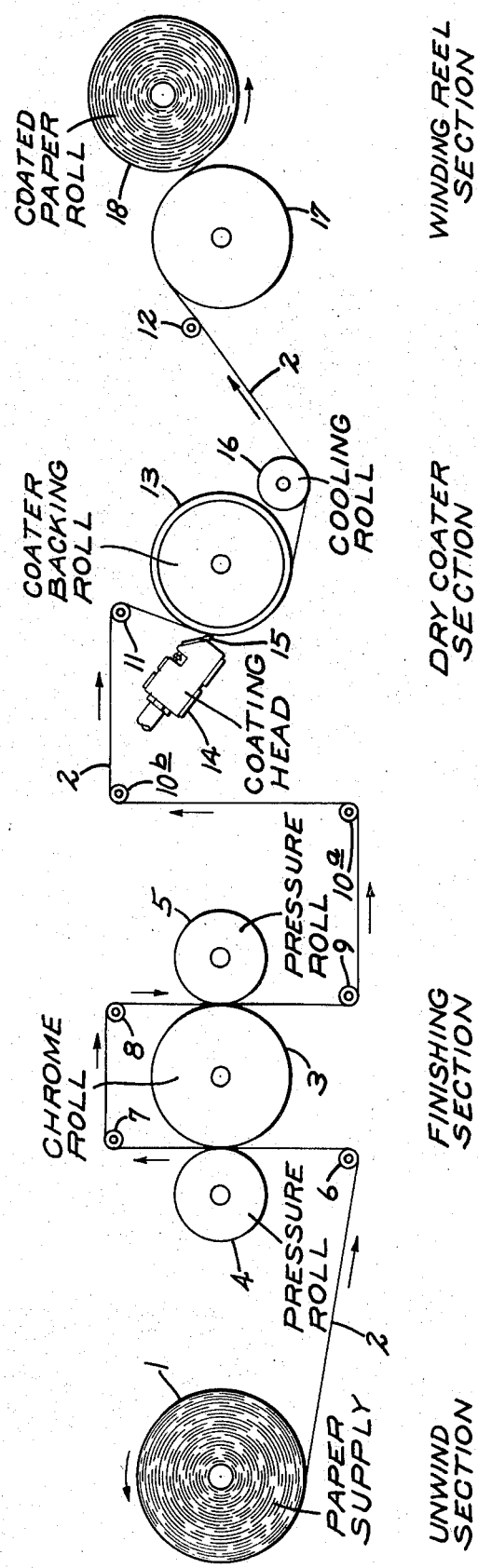

3,723,169
PROCESS OF COATING PAPER
Samuel L. Guastella, Westminster, Mass., and Jerry J. Larrivee, Jr., Gorham, Maine, assignors to Blandin Paper Company, Grand Rapids, Minn.
Continuation-in-part of application Ser. No. 866,766, Oct. 15, 1969. This application Jan. 12, 1970, Ser. No. 1,995
Int. Cl. B44d 1/02
U.S. Cl. 117—111 H      8 Claims

ABSTRACT OF THE DISCLOSURE

The process of coating a paper base with a hot melt coating composition which is comprised of at least 50 weight percent of a coating pigment or a mixture thereof dispersed in an undiluted, heat extrudable binder (e.g., a normally solid thermoplastic resin), said binder comprising less than 50 weight percent of the total weight of the coating composition. For example, a publication paper is prepared by coating an uncoated, prefinished, ground wood paper on both sides with a coating composition that comprises a normally solid ethylene polymer or copolymer and a clay pigment wherein the amount of pigment is greater than 50% by weight of said coating. The total coating weight (both sides) is less than 15 grams per square meter (gms./m.$^2$).

CROSS-REFERENCE TO RELATED PATENT APPLICATIONS

This application is a continuation in part of our co-pending United States patent application, Ser. No. 866,-766 filed Oct. 15, 1969, and now abandoned, which describes and claims coating compositions useful in this process.

Coating apparatus suitable for use in the present process is disclosed in United States patent application, Ser. No. 843,677, filed July 22, 1969, now U.S. Pat. No. 3,690,-297, patented Sept. 12, 1972.

BACKGROUND OF THE INVENTION

It is common in the paper making industry to coat paper on one or both sides with one or more coating compositions to thereby obtain various desired properties (e.g., good printing qualities, moisture resistance, etc.). One example is the manufacture of publication papers which are used in, for example, the preparation of magazines having a high paper quality. Illustrative prior art coating compositions which can be used in the preparation of publication papers are described in the following United States patents: U.S. 3,480,455 of Charles A. Richardson; U.S. 3,157,533 of Clancey et al.; and U.S. 3,002,844 of Reiling.

These prior art coating compositions are used to obtain, for example, opacity and brightness in publication papers. They are typically applied as liquid coating compositions using, for example, a trailing blade coater. Such liquid compositions contain substantial amounts of a diluent (e.g., hydrocarbon solvents or water) and require the use of heated rolls or other drying means to effectively remove the diluent from the wet coating to thereby produce dry coated paper. Such liquid compositions are referred to as solvent-based and water based coating compositions. The diluents used in such prior art coating compositions can cause the paper being coated to become distorted.

In addition to such liquid (e.g., water based) coating compositions, hot melt or heat extrudable coating compositions have also been used in some special applications to coat paper products. Examples include the production of: water resistant coatings for corrugated paper and poultry shippers; heat sealable overwraps for pastries; and pressure sensitive labels (i.e., adhesive backed labels). Such hot melt systems are frequently used without pigmentation or with only minor pigmentation (i.e., less than 10% pigmentation). Additionally, such hot melt systems are ordinarily applied to paper products for these special applications at high coating weights (e.g., above 25 grams of coating per side per square meter of coated paper). Still further, some processes for applying these coatings are effective only at low paper speeds (e.g., below 35 lineal meters per minute).

SUMMARY OF THE INVENTION

The present invention involves the discovery that useful paper products can be prepared by a process which involves coating a paper base with a hot melt coating system wherein the hot melt or heat extrudable coating composition is undiluted (i.e., not solvent or waste based) and contains as essential ingredients a heat extrudable binder (e.g., polyethylene) and a coating pigment (e.g., clay) wherein the amount of coating pigment is at least 50% of the total weight of the hot melt coating composition.

We have found that by using these highly pigmented hot melt coating compositions in our process we can efficiently produce paper products of high quality. In this respect, the process of this invention offers advantages over present commercial practices involving the use of solvent or water based coating systems (e.g., in our process no heat is required to volatilize the water or solvent). Additionally, it is possible with our process to produce paper of good quality (e.g., publication paper) at lower coating weights than we previously found commercially practical when using solvent and water based coating compositions in conventional paper coating processes. Other advantages of our process exist.

THE DRAWING

The single drawing is a flow diagram illustrating the present process as applied to a moving web.

DETAILED DESCRIPTION

The coating process

In the broad sense, the process of the present invention involves the coating of a paper base (e.g., a high speed web of ground wood paper) with a highly pigmented hot melt coating composition. Such coating compositions are typically comprised of at least fifty weight percent of a coating pigment or a mixture thereof dispersed in an undiluted, heat extrudable binder (e.g., a normally solid thermoplastic resin), said binder comprising less than fifty weight percent of the total weight of the coating composition. Such coating compositions are more fully described following this description of the coating process.

The process can be applied to a variety of paper bases, all as hereinafter set forth. However, it is particularly well suited to the coating of a moving web of paper. Accordingly, the process is hereinafter described with reference to the coating of a moving web of paper without intending to be limted thereby.

Referring now to the drawing, it can be seen that the apparatus used in the present process comprises an unwind section that includes a supply of paper 1 (e.g., a roll of paper). The paper web 2 is unwound from the paper supply 1 and moved in the direction of the arrow to a finishing section. The use of a finishing section is optional, but preferred. The purchase of the finishing section is to impart a smooth surface to one or both sides of the paper web 2 to thereby increase the quality of the coated paper which is the final product of this process. In the finishing section, the moving web of paper 2 is pressed against a hard (e.g., chrome plated) backing roll 3 by pressure rolls 4 and 5. Small rolls 6, 7, 8, 9, 10a, 10b, 11 and 12 are used to control the tension on paper web 2 and to give the web directional orientation. From the finishing section, the paper web 2 is passed to a dry coating section which comprises a coater backing roll 13 and a coating head 14. Although a variety of techniques can be used for applying hot melt coatings to moving webs, it is preferred to use an extrusion coating head as shown in the drawing. Such a coating head extrudes a thin sheet of hot coating composition against the moving paper web 2. The arrangement of coating head 14 and backing roll 13 as shown in the drawing causes a small pond of molten coating composition to be created in the trough formed by the rigd blade 15 of the coating head 14 and by moving paper web 2. The details of construction of an extrusion coating head particularly well suited for this purpose is described and claimed in our copending U.S. application, Ser. No. 843,677, filed July 22, 1969.

The temperature of application of the hot melt coatings of this invention as measured in the coating head 14, will normally be within the range of 250°–500° F. (i.e., about 120°–260° C.), usually within the range of 350°–450° F. (i.e., about 175°–230° C.). However, the temperature of application will vary depending upon the particular end use of the paper products being manufactured and the type of coating composition which has been employed. For example, in preparing frozen food cartons it is possible to use coating compositions made from binders having substantially lower melting points or softening points than would be necessary for other industrial applications where heat resistance of coated paper products is important. Usually, the coating composition wil be melted before reaching the coating head 14.

Usually, rigid coating blade 15 will be pressed against the moving paper web 2 at pressures of up to 10 kg. per lineal cm. of blade width (e.g., 1–8 kg./cm.). The coater backing roll is preferably a steel roll covered with a resilient material such as Teflon or rubber (e.g., a one cm. layer of rubber having a hardness of 60 on the P & J scale). With such a combination of blade pressure and resilient backing roll, the blade will depress the surface of the backing roll along the line of contact.

The coating blade 15 can be heated by use of heating elements in or around coating head 14. It can also be provided with its own heating elements. Molten coating composition will also heat the blade 15.

As the paper web 2 passes the coating head 14, the hot coating composition will normally cool rapidly and solidify. However, the optional use of cooling roll 16 may sometimes be desirable or necessary to cool the coated paper to avoid stickiness and other problems during rewind.

From the coating section, the coated paper web 2 is then passed over roll 17 and rewound to form a roll of coated paper 18.

Although the process as shown in the drawing represents a preferred form of this invention, it will be appreciated that the process can be carried out by the use of other types of coating equipment and by other sequences of operation. For example, the coating composition described herein can be applied to paper bases in curtain coaters, gravure coaters, and kiss roll coaters. The particular apparatus and technique that is selected for use in any particular instance will depend upon a consideration of many factors including the type of paper base to be coated, the coating composition to be applied, the desired coating weight, speed requirements, and the like. Selection of a suitable method of application under any given set of circumstances is within the skill of the art when aided by this disclosure.

It is possible to utilize the process of this invention on paper webs moving at lineal speeds as high as 1500 meters per minute, or higher. However, it will usually and preferably be applied to paper webs moving at lineal speeds of from 150–1,000 lineal meters per minute (e.g., 200–800 m./min.).

The amount of hot melt coating which is applied to a paper web will, under most circumstances, be sufficient to provide a coating weight of from 0.75–45 grams/m.$^2$, more usually from 3–30 grams/m.$^2$. However, as will be recognized by those skilled in the paper industry, higher or lower coating weights than those specified herein may sometimes be desired and can be obtained by use of the present process.

Paper base

All types of paper and paperboard can be used in the practice of the present invention, although all such paper bases do not serve with equal effectiveness and some obvious process modifications are required to accommodate different paper bases (e.g., paper webs and paper board must be handled differently as known in the art; yet both can be coated according to this invention). The paper base can be made from any of the usual sources of cellulose such as wood, cotton, linen rags and the like. The paper base can be of the type commonly used for newsprint, publication papers, special industrial papers, sanitary tissues, corrugated paper, paperboard liners, folding boxboard, cardboard, construction paper, building board, and the like.

The process is particularly well suited for use with moving webs (e.g., long ribbons of paper). Webs other than paper webs can be coated by the present process (e.g., Mylar).

Ground wood paper is particularly useful in the practice of this invention. As known in the art, ground wood paper differs from other types of paper in that the former is prepared from a mechanical pulp which contains all of the wood constituents, while other papers are made from chemical pulp which is essentially pure cellulose with lignin and other non-cellulosic components of the wood having been dissolved away during the pulping process.

Uncoated paper weighing less than 300 gms./m.$^2$, preferably weighing less than 120 gms./m.$^2$, desirably within the range of 30–75 gms./m.$^2$, is particularly useful in the practice of our invention.

As known in the art, fillers, resins and coloring agents are frequently added to the paper pulp before forming the sheet or web. Typically, such additives are mixed with the pulp in the beater, in the Jordan, or in both.

Paper bases used in the practice of this invention can be uncoated or precoated. Normally, it is possible to obtain the desired end results (in terms of coated paper properties) without precoating or even without sizing and, as a consequence, we prefer to use uncoated paper bases in the practice of our invention so that the resulting coated paper products have, as the only coating thereon, coatings provided in accordance with our invention.

Although top coats can be applied over our coating compositions (after they have hardened), we prefer to avoid the use of such coatings because of the added costs and coating weights which are involved.

We prefer that paper bases which are to be coated with our composition be prefinished or smoothed prior to the application of our hot melt coatings. Such prefinishing can be accomplished in, for example, gloss calenders, super calenders, etc.

The hot melt coating compositions

The coating compositions of the present invention are compositions which are intended to be applied to the paper base while the coating compositions are hot (e.g., 250°–450° F.). These hot melt coating compositions are diluent-free, i.e., they do not contain substantial amounts of free water or volatile hydrocarbon solvents as is normally common to highly pigmented coating compositions used in the paper industry. Of course, our compositions may contain small amounts of moisture (e.g., less than 1% by weight) but they are readily distinguishable from solvent based and water based coating compositions as known in the art. Moisture present as bound water (e.g., as water of hydration in common clay pigments) is considered to be part of the pigment and is not considered to be a diluent for our purposes.

The major or dominant ingredient in our hot melt coating compositions is a coating pigment or a mixture thereof. Suitable pigments include clay, titanium dioxide, zinc oxide, calcium carbonate, talc, hydrated amorphous silicas, hydrous sodium silicoaluminates, and the like. The particle size of such pigments can vary widely. It is convenient to use commercialy available pigments which typically have a particle size distribution resulting in more than 50% by weight of the particles being smaller than 5 microns (equivalent spherical diameter as determined by settling techniques).

The second essential ingredient of our hot melt coating compositions is one or more binders or a mixture of binder forming ingredients, the total of which represents less than 50% by weight of the total weight of the hot melt coating compositions. The weight ratio of pigment to binder in these coating compositions will be greater than 1:1, typically greater than 1.5:1, more usually above 2:1, and very often in the ratio of 3-8:1. Although the binder can be any suitable thermosetting or thermoplastic resin or resin system, we have found substantial advantages associated with the use of normally solid (i.e. solid at 70° F.) thermoplastic binders (e.g., polyethylene). Thermoplastic binders are easier to use, waste material can be recovered and reused, and the resulting coatings on paper can be softened and manipulated subsequent to the paper coating process.

Suitable binders include but are not limited to the following:

Acrylonitrile butadiene styrene
Acrylonitrile styrene copolymer
Cellulose propionate
Ethyl cellulose
Polyamide
Polyethylene (low density)
Polyethylene (medium density)
Polystyrene (casting, extrusion)
Polytrifluorochloroethylene
Polyvinyl chloride (flexible)
Vinyl chloride-acetate copolymers (flexible)
Cellulose acetate
Cellulose acetate butyrate
Cellulose triacetate
Fluorinated ethylene
Polycarbonate
Polymethyl methacrylate
Polypropylene
Polytetrafluoroethylene
Rubber hydrochloride
Vinylnitrile rubber Of these, polymers and copolymers of ethylene are especially useful, with polyethylene being the preferred binder.

In general, the binders used in this invention will have a melt index (as determined by standard ASTM test procedures of from 30-400, preferably 50-250.

The remaining portion, if any, of the hot melt coating compositions of this invention will be additives of various sorts (e.g., flow improvers, resin modifiers, plasticizers, dispersants, dyes, etc.). Typically, the total amount of all such additives will be less than 20% and ordinarily less than 10% of the total weight of the coating composition (the balance being binder and pigment, only).

The coating compositions of this invention can be prepared by simple mixing of the ingredients at room temperatures to form a dry mix or at a temperature above the melting point of the binder (e.g., above the melting point of polyethylene) to form a more homogeneous mixture of ingredients. It is convenient to perform the mixing below the melting point of the binder with a high shear intensive mixer (e.g., 8000 r.p.m.).

The present invention will be further understood by reference to the following specific examples which include a preferred embodiment. Unless otherwise indicated, all parts and percentages are by weight.

EXAMPLE 1

A hot melt coating composition was prepared from the following ingredients in the proportions indicated by simple mixing after first heating the mixture above the softening point of the polyethylene.

| Ingredients: | Weight percent |
|---|---|
| (a) Coating pigments | |
| Clay (HT) | 63 |
| Titanium dioxide (RA50) | 7 |
| (b) Binder | |
| Polyethylene with a melt index of 250 and a density of 0.926 (NA 250) | 20 |
| Waxy low molecular weight polyethylene (Paraflint) | 5 |
| (c) Additives | |
| Flow improver (Wingtack 95) | 5 |
| | 100 |

The pigments provide opacity and brightness to coated paper products. The pigments are selected for their coating properties as well as for their compatibility or wettability in the presence of the melted binder, their effect on binder viscosity, and other normal considerations (e.g., cost).

In this example, a high melt index polyethylene was used as the principal binder. Its use is preferred. The waxy low molecular weight polyethylene contributes to producing a smooth coating on the finished paper product.

The flow improver used in this example reduces the temperature neeeded for melting the coating composition and reduces the viscosity of the coating composition.

This coating composition was applied to a 51 cm. wide uncoated, unsized paper web (weighing about 42 gm./m.²) having a speed of 230 m. per minute. This paper was of the type used for the manufacture of fine quality magazines. The coating process was as shown in the drawings except that the finishing section (i.e., the gloss calender) was omitted. The temperature of application was 205°–220° C. (i.e., about 400°–425° F.) as measured at the point of application in the extrusion coating head. The pressure of the coating blade on the moving paper web was about 2.2 kg./cm. The backing roll was a steel roll covered with rubber of a P & J hardness of about 60. The cooling roll was operated at 22° C. (i.e., about room or ambient temperature).

The resutling coated paper was a bright white product having an ink receptive coating of uniform thickness (about 4.5 gm./m.² of coating). Because the coating composition was diluent-free, no significant amount of water or other solvent contacted the paper and the paper did not become distorted as might have been the case if an aqueous coating solution had been employed.

EXAMPLES 2-4

These examples illustrate other coating compositions prepared according to the present invention.

| Ingredients | Example 2 | Example 3 | Example 4 |
|---|---|---|---|
| (a) Coating pigments: | | | |
| Clay HT | 18.000 | 50.000 | 54.000 |
| Titanium dioxide (RA 50) | 2.000 | 5.000 | 6.000 |
| (b) Binder: | | | |
| Polyethylene (M.I. of 70) | 3.440 | 25.000 | |
| Ethylene/vinyl acetate copolymer (Elvax 310) | | | 40.000 |
| Waxy low molecular weight polyethylene (Paraflint) | 0.780 | 20.000 | |
| (c) Additives: | | | |
| Flow improver (Wing Tack 95) | 0.780 | | |
| Zinc stearate | 0.009 | 0.036 | 0.037 |
| Total weight (pounds) | 25.010 | 100.036 | 100.037 |

The compositions of Examples 2-4 were each applied to separate, individual sheets of paper (weighing about 42 gms./m.²) in a bench model laboratory coater to thereby provide coatings of from about 2.2 to 3.75 gms./m.². In this laboratory coater, the uncoated paper sheets were fastened to a rubber covered backing roll which was rotated past a heated rigid coating blade which was in pressure contact with the paper. The solid coating compositions were merely placed on the heated blade, melted, and permitted to form a pond of molten coating in the trough formed between the coating blade and the paper clad, rubber covered, backing roll.

EXAMPLE 5

This example illustrates the preparation of a lightweight publication paper by the coating process substantially as shown in the drawing. The finishing section was bypassed because the paper to be coated was sufficiently smooth to begin with.

A highly finished, unsized, uncoated ground wood paper (approximately 45 grams/m.²) was fed from an unwind stand around suitable tension rolls and then passed down and under a rubber covered backing roll and then on to rewind apparatus. A hot melt extrusion coating head was positioned transverse of the rubber coated backing roll as shown in the drawing. The coating head was equipped with a stiff coating blade which in operation was in pressure contact with the paper web, thereby forcing the web against the rubber coated backing roll. The coating head was inclined downwardly from the horizontal so that molten coating being extruded from the lower end of the coating head was spread across the full width of the coating blade (confined at the end between deckles) thereby forming a small pond of molten coating composition in the trough defined by the downwardly moving paper web and the coating blade. As the web passed by the blade, all but a thin film of coating material was retained in the small pond above the blade. The coating composition was the composition of Example 3 and was applied at a temperature of about 210°–215° C. The coating set almost immediately upon passing the blade and no chill rolls were required. By adjusting the speed of the web (230–700 m./min.) and adjusting the pressure on the coating blade (2.2–4.4 kg./cm.) with a fixed extrusion grap (0.035-inch gap), it was possible to vary the coating weight in limited production over a relatively wide range (from about 3.9 to 30 gms./m.²) and it was possible to produce coated paper of good quality, even at low coating weights (e.g., below 4.5 gms./m.²). The resulting coatings were adherent and were uniform, smooth films.

The reverse side of the paper can be coated by passing coated paper of Example 5 past a second coating station or by inverting the coated paper and sending it past the first coating station for a second time.

What is claimed is:

1. The process of coating a moving paper web comprising the steps of:
   (a) passing said web around a backing roll;
   (b) pressing said web against said backing roll with a rigid coating blade to thereby form a trough between said blade and said moving web;
   (c) extruding into said trough a relatively thin sheet of molten hot-melt coating composition comprised of at least 50 by weight of coating pigment dispersed in a diluent-free, heat extrudable binder or mixture of binders, said binder or mixture of binders having a melt index of about 30–400;
   (d) maintaining a small pond of molten coating composition in said trough; and
   (e) recovering coated paper.
2. The process of claim 1 in which said paper web is moving at a speed of 150–1000 m./min.
3. The process of claim 2 wherein said binder comprises a polymer or copolymer of ethylene.
4. The process of claim 3 wherein said pigment comprises clay.
5. The process of claim 4 wherein the weight ratio of pigment to binder is greater than 1.5 to 1.
6. The process of claim 5 wherein the binder is polyethylene and the pigment is a mixture of clay and titanium dioxide.
7. The process of claim 6 wherein said backing roll is covered with a resilient material.
8. The process of claim 7 wherein the weight of said coating on said paper is 3–30 grams/m.².

References Cited

UNITED STATES PATENTS

| | | | |
|---|---|---|---|
| 2,764,509 | 9/1956 | Ritson et al. | 117—155 |
| 3,070,066 | 12/1962 | Faeber | 118—413 |
| 3,281,267 | 10/1966 | Rice | 117—155 |
| 3,348,526 | 10/1967 | Neubauer | 118—410 |
| 3,511,693 | 5/1970 | Davidson | 117—111 X |
| 3,518,964 | 7/1970 | Nagler | 118—410 X |
| 3,522,041 | 7/1970 | Staley | 96—1.8 |
| 3,506,477 | 4/1970 | Desauliners et al. | 117—155 X |
| 2,732,319 | 1/1956 | Cree | 117—158 X |
| 3,470,278 | 10/1969 | Weber | 264—54 |
| 3,301,327 | 4/1962 | Newman | 117—158 X |
| 3,501,330 | 3/1970 | Cassiers et al. | 117—34 |

FOREIGN PATENTS 456,377  11/1936  Great Britain _____ 117—111 H

OTHER REFERENCES

Modern Plastics Encyclopedia, 1968, pp. 207–208.

MURRAY KATZ, Primary Examiner

M. R. LUSIGNAN, Assistant Examiner

U.S. Cl. X.R.

117—155 UA, 158